United States Patent [19]

Feldtkeller et al.

[11] Patent Number: 5,086,382

[45] Date of Patent: Feb. 4, 1992

[54] CIRCUIT CONFIGURATION FOR A CONTROLLED BLOCKING OSCILLATOR CONVERTER SWITCHING POWER SUPPLY

[75] Inventors: Martin Feldtkeller, München; Rainer Dangschat, Landsham, both of Fed. Rep. of Germany

[73] Assignee: Siemens Aktiengesellschaft, Munich, Fed. Rep. of Germany

[21] Appl. No.: 591,146

[22] Filed: Oct. 1, 1990

[30] Foreign Application Priority Data

Sep. 29, 1989 [EP] European Pat. Off. ........ 89118086.1

[51] Int. Cl.⁵ .......................................... H02M 3/335
[52] U.S. Cl. ........................................ 363/21; 363/97
[58] Field of Search ............... 363/20, 21, 56, 131, 363/97

[56] References Cited

U.S. PATENT DOCUMENTS

| | | |
|---|---|---|
| 4,564,820 | 1/1986 | Peruth et al. . |
| 4,597,036 | 6/1986 | Paulik et al. ........................ 363/21 |
| 4,648,016 | 3/1987 | Peruth et al. ...................... 363/21 |
| 4,740,879 | 4/1988 | Peruth .............................. 363/21 X |
| 4,740,880 | 4/1988 | Peruth .............................. 363/21 X |
| 4,763,238 | 8/1988 | Maige ................................. 363/21 |
| 4,975,823 | 12/1990 | Rilly et al. ....................... 363/21 X |

FOREIGN PATENT DOCUMENTS 0144754 6/1985 European Pat. Off. .
0240434 10/1987 European Pat. Off. .

OTHER PUBLICATIONS

Publication by J. Wüstehube, entitled "Schaltneztteile" (Switching Power Supplies), 1979, published by Expert-Verlag in Grafenau, Fed. Repub. of Germany.
Publication Siemens Product Brochure entitled "IC's für die Unterhaltungselectronik" (IC's for Electronic Entertainment Systems), Aug. 1987, TDA 4605 on pp. 46–63.
IBM Technical Disclosure Bulletin 29 (1987) Apr., No. 11, Armonk, N.Y., U.S.A.

Primary Examiner—Steven L. Stephan
Assistant Examiner—Emanuel Todd Voeltz
Attorney, Agent, or Firm—Herbert L. Lerner; Laurence A. Greenberg

[57] ABSTRACT

A circuit configuration for a controlled blocking oscillator converter switching power supply includes an electric switch having a duty cycle. A transformer has a primary winding connected in series with the electric switch in the loop of a direct voltage source for alternatingly turning on the switch in a first operating phase and turning off the switch in a second operating phase, and a secondary winding outputting an alternating voltage from which a direct voltage is obtained. An integratable trigger circuit is connected to the switch for pulse width modulated switching of the switch. The integratable trigger circuit has a controller for receiving an input voltage being at least approximately proportional to the alternating voltage, for comparing the input voltage with a set-point voltage, and for deriving a further voltage in the form of the voltage of a capacitor from the difference between the two voltages. The controller includes a controlling rectifier for charging the capacitor when the input voltage is less than the set-point voltage and discharging the capacitor when the input voltage is greater than the set-point voltage in the second operating phase. A pulse width modulator is connected between the controlling rectifier and the capacitor for determining the duty cycle of the switch as a function of the further voltage.

31 Claims, 2 Drawing Sheets

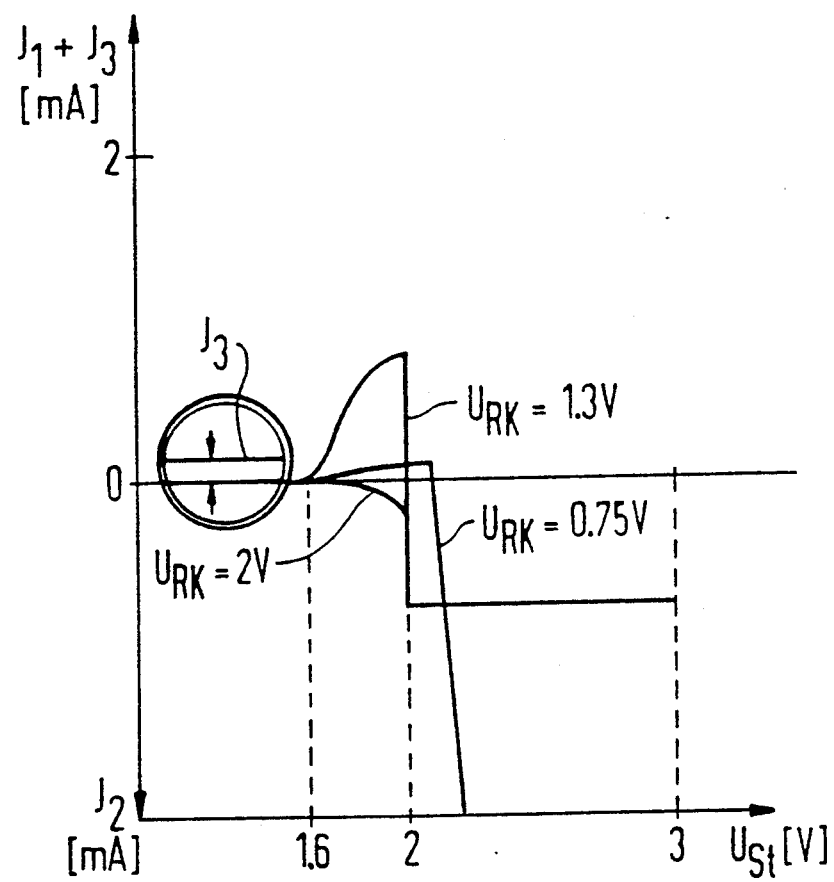

CIRCUIT CONFIGURATION FOR A CONTROLLED BLOCKING OSCILLATOR CONVERTER SWITCHING POWER SUPPLY

The invention relates to a circuit configuration for a controlled blocking oscillator converter or flyback converter switching power supply or power pack, including a transformer having a primary winding in series with an electric switch in the loop of a direct voltage source, the switch being alternatingly turned on in a first operating phase (flux phase) and turned off in a second operating phase (blocking phase), and a secondary winding outputting an alternating voltage (secondary winding voltage), from which a direct voltage (output voltage) is then obtained; an integratable trigger circuit for pulse width modulated switching of the switch, having a controller for receiving an input voltage (feedback voltage), comparing the feedback voltage with a set-point voltage, and deriving a further voltage (set voltage) from the difference between the two voltages, and a pulse width modulator determining the duty cycle of the switch as a function of the set voltage.

Many versions of blocking oscillator converters having such circuits are known. For instance, reference is made to the monograph edited by J. Wüstehube, entitled "Schaltnetzteile" [Switching Power Supplies], 1979, published by Expert-Verlag in Grafenau, Federal Republic of Germany, and particularly to chapter 3 thereof.

Primary-clocked switching power supplies or switch power packs are intended to convert an unregulated input voltage into a stable output voltage. For this purpose, the actual voltage at the output is detected and compared with a reference voltage, and the duty factor of the primary switch is controlled with the control deviation obtained from the comparison.

In a known primary-clocked blocking oscillator converter, a voltage signal picked up at a primary additional winding is first carried through a low-pass filter, in order to filter out high-frequency components, then rectified and smoothed, and finally divided downward by a calibratable voltage divider before it reaches an integrated trigger circuit, in which it is further processed. Regarding such aspects, reference is made to the Siemens Product Brochure entitled "IC's für die Unterhaltungselektronik" [IC's for Electronic Entertainment Systems], August 1987 edition, in which a trigger component TDA 4605 is described on pages 46-63 thereof.

Such signal detection is still not entirely satisfactory, in various respects. Unless the switching power supply is heavily loaded, the filtered voltage signal no longer precisely matches the output voltage. Additional provisions must therefore be made in order to obtain the desired load voltages in standby operation, for instance. A further consideration is that the signal conversion requires a not inconsiderable number of external components. The expense for external, integrated switching elements becomes even greater if the switching power supply is also intended to have a soft start. In that case, as the aforementioned brochure shows, the trigger component must be expanded by a circuit block that sends the trigger pulses for the switch along a ramp voltage which is furnished by a further external capacitor connected to its own IC connection. Other circuit blocks are necessary if the switching power supply is also to be protected against damage in still other critical control situations, such as an overload at the output or an interruption in the control loop.

It is accordingly an object of the invention to provide a circuit configuration for a controlled blocking oscillator converter switching power supply, which overcomes the hereinafore-mentioned disadvantages of the heretofore-known devices of this general type and to construct the integratable trigger circuit in such a way that it enables adequate control of the output voltage with less external wiring and moreover offers the opportunity of achieving additional functions, such as soft starting, overload protection or run-up suppression if the control loop is interrupted, at minimal additional expense and in particular without further peripheral components. With the foregoing and other objects in view there is provided, in accordance with the invention, a circuit configuration for a controlled blocking oscillator converter switching power supply, comprising an electric switch having a duty cycle; a transformer having a primary winding connected in series with the electric switch in the loop of a direct voltage source for alternatingly turning on the switch in a first operating phase and turning off the switch in a second operating phase, and a secondary winding outputting an alternating voltage from which a direct voltage is obtained; a capacitor having a voltage; an integratable trigger circuit connected to the switch for pulse width modulated switching of the switch, the integratable trigger circuit having a controller for receiving an input voltage being at least approximately proportional to the alternating voltage, for comparing the input voltage with a set-point voltage, and for deriving a further voltage in the form of the voltage of the capacitor from the difference between the two voltages, the controller including a controlling rectifier for charging the capacitor when the input voltage is less than the set-point voltage and discharging the capacitor when the input voltage is greater than the set-point voltage in the second operating phase, and a pulse width modulator connected between the controlling rectifier and the capacitor for determining the duty cycle of the switch as a function of the further voltage. In accordance with another feature of the invention, the first operating phase is a flux phase, the second operating phase is a blocking phase, the alternating voltage is a secondary winding voltage, the direct voltage is an output voltage, the input voltage is a feedback voltage, the further voltage is a set voltage, the rectifier is an active rectifier, and the capacitor is a variable capacitor.

The circuit proposed herein breaks with the previously followed rule of forming a feedback voltage that was proportional to the (rectified, filtered) output voltage and modulating the switch with the deviation of this voltage from a set-point value. Instead, the feedback voltage is left proportional to the secondary winding voltage (which fluctuates and has a change in algebraic sign, i.e. + or −), and is used in the blocking phase in order to correct a voltage furnished by a variable capacitor (known as the "operating voltage") by tripping a charging or discharging process. This voltage correction, which could be called "active rectification", is insensitive to the unavoidable fluctuations in the control signal, such as the high- frequency phenomenon known as "transformer ringing", because on balance, the charge at the variable capacitor is not changed if the wavy control signal during the blocking phase is above the set-point value for half of the time and below it for the other half of the time. Moreover, the system of the invention makes do with only one external variable capacitor and a limited number of relatively simple, readily integratable circuit elements.

In accordance with a further feature of the invention, there is provided one switchable 1 mA current source and one switchable 1 mA current sink for the variable capacitor.

In accordance with an additional feature of the invention, the current source is switched on only whenever 0.5 the set-point voltage is less than a threshold value which is less than 0.9 the set-point voltage ($0.5 \, U_{Soll} > U_{SW} < 0.9 \, U_{Soll}$). Furthermore, there may be provided a second current source connected to the variable capacitor for continuously charging the variable capacitor with a third current intensity during operation of the switching power supply, the third current intensity being less than 1/10 the first current intensity, and particularly wherein 1/1000 the first current intensity is less than the third current intensity which is less than 1/50 the first current intensity ($1/1000 \, I_1 < I_3 < 1/50 \, I_1$).

If it is to provide a soft start for the switching power supply as well, the integratable control circuit becomes only insignificantly more complex. A soft start is obtained even if the variable capacitor, with the apparatus switched on, charges continuously with a very weak current, that is typically approximately 10 μA. Then the variable capacitor in fact automatically receives a ramp voltage that gradually lengthens the duty cycle of the switch.

Switching power supplies are often constructed in such a way that their transformer is driven to saturation if the trigger pulses for the switching transistor become overly long. In order to avoid this effect, which can lead to destruction of the switch, in accordance with an added feature of the invention, there is provided a voltage-limiting transfer circuit is introduced between the variable capacitor and the pulse width modulator and also suppresses the charging of the capacitor, which is influenced by the feedback voltage, whenever the set voltage attains the value that trips the limitation. If the variable capacitor is also supplied by a weak current source, as already mentioned, then even if that value is exceeded, it continues to charge slowly, as long as the feedback voltage is below its set-point value. If the set-point value continues to rise continuously, this indicates an output overload.

In accordance with an additional feature of the invention, in order to interrupt operation in this case, it is recommended that the set voltage activate a turnoff or cutoff logic which then blocks the switch, whenever a further limit value $U_{gr2}$ is exceeded. The switching power supply must be constructed in accordance with a VDE specification (VDE=Association of German Electrical Engineers) or other government regulations to prevent fire from breaking out in the circuit if control loop components are interrupted or short-circuited.

Fire prevention means of this kind can be built in particularly conveniently in a circuit configuration according to the invention: The original equipment of every modern blocking oscillating converter includes a demagnetization monitor, which does not enable the trigger pulses for the switch until the secondary winding voltage has changed its polarity in the blocking phase. If the input signal for the demagnetization monitor is derived from the feedback signal before the active rectifier, then the switching power supply does not start up if the control loop is interrupted; it cannot even oscillate, if the demagnetization signal is absent.

Since a circuit configuration according to the invention makes do with relatively few IC connections, it is above all suitable for fixed-frequency blocking oscillator converters, in which it is more difficult than in freely oscillating blocking oscillator converters to keep the pin number of the trigger component within limits.

Other features which are considered as characteristic for the invention are set forth in the appended claims.

Although the invention is illustrated and described herein as embodied in a circuit configuration for a controlled blocking oscillator converter switching power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 3 is a graph of charge and discharge currents $I_1$, $I_2$ and $I_3$ of a variable capacitor of FIG. 2, as a function of a feedback voltage $U_{RK}$, at a plurality of set voltages $U_{St}$.

Figure 1:
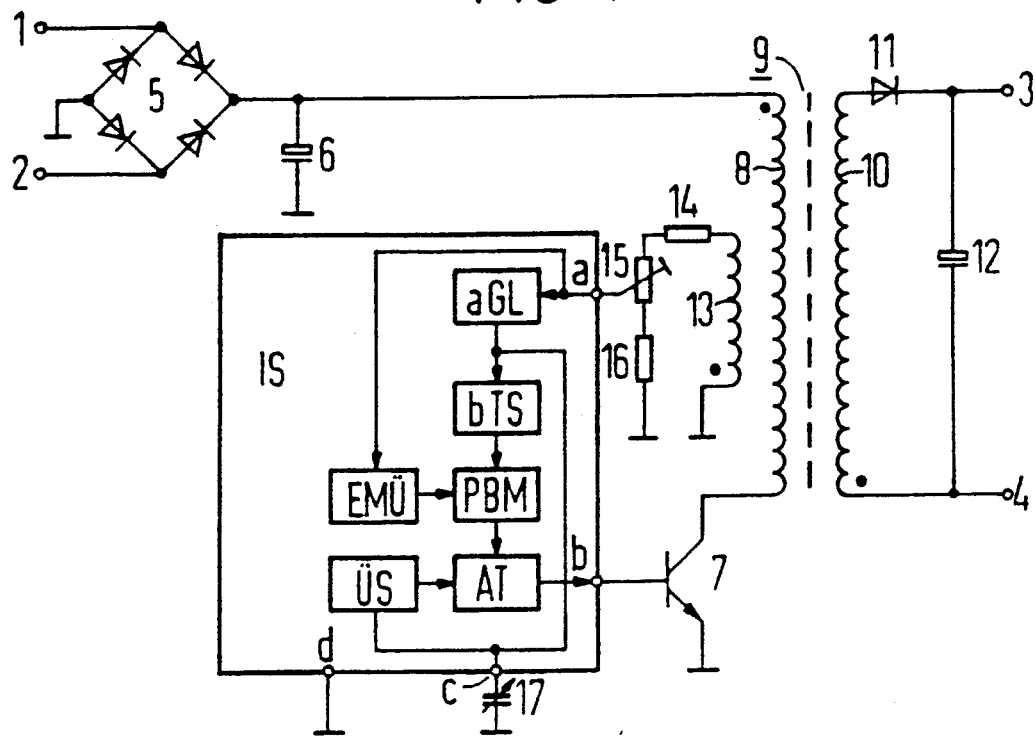
FIG. 1 is a schematic and block circuit diagram of a switching power supply according to an exemplary embodiment of the invention.

For the sake of simplicity, the circuit configurations in the drawing figures are only shown to the extent that is absolutely necessary for comprehension of the invention. These circuits are described at length in co-pending application Ser. No. 591,137, filed on the same date as the instant application, having the same inventor, and being entitled "Circuit Configuration for a Fixed-frequency Blocking Oscillator Converter Switching Power Supply".

Referring now in detail to the figures of the drawings, in which elements that are equivalent to one another are identified by the same reference numerals, and first, particularly, to FIG. 1 thereof, there is seen a switching power supply or switch power pack which is a blocking oscillator converter or flyback converter operating at a fixed frequency at a rated load, which generates a stabilized direct voltage between terminals 3 and 4 from a mains voltage picked up between terminals 1 and 2. In order to do this, the mains voltage is first rectified in a rectifier 5, smoothed in a charge capacitor 6, and carried through an electrical switch, which in the present case is a bipolar transistor 7, to a first primary winding (supply winding 8) of a transformer 9. During the conducting phase of the transistor, energy is magnetically stored in the transformer 9. In the blocking phase, this energy is given up through a secondary winding 10 of the transformer 9 to a consumer or consuming element, which is not shown but is located between the terminals 3 and 4. The voltage dropping at the consumer is rectified and filtered by a diode 11 and a further charge capacitor 12.

The circuit includes a trigger component IS, which triggers the transistor 7 with pulse width modulation. In order to fix both the turn-on time and the duty cycle of the transistor 7, the component receives a first voltage signal (feed-back signal) $U_{RK}$ at a pin a. This signal is delivered to the pin from a second or control winding 13 which is firmly coupled to the secondary winding 10, through a calibratable voltage divider constructed of resistors 14, 15 and 16. At a further connection provided by a pin b, the trigger component then emits trigger pulses to the base of the switching transistor 7. The trigger component is also connected at pin c to a variable capacitor 17 that is connected to ground and is also grounded through a further connection at a pin d.

In the trigger component IS, the feedback voltage is carried in a first branch to an active rectifier aGL of a controller, which acts upon the switching transistor 7 through a limiting transfer circuit bTS, a pulse width modulator PBM and an output driver AT. In a second or further branch, the feed-back voltage acts upon the pulse width modulator PBM through a demagnetization monitor EMÜ. The voltage of the variable capacitor 17 is firstly carried to the block bTS, which is provided with corrections by the active rectifier, and secondly it is connected to a monitoring circuit ÜS that contains a turn-off logic AL seen in FIG. 2 and in turn acts upon the output driver AT.

Figure 2:
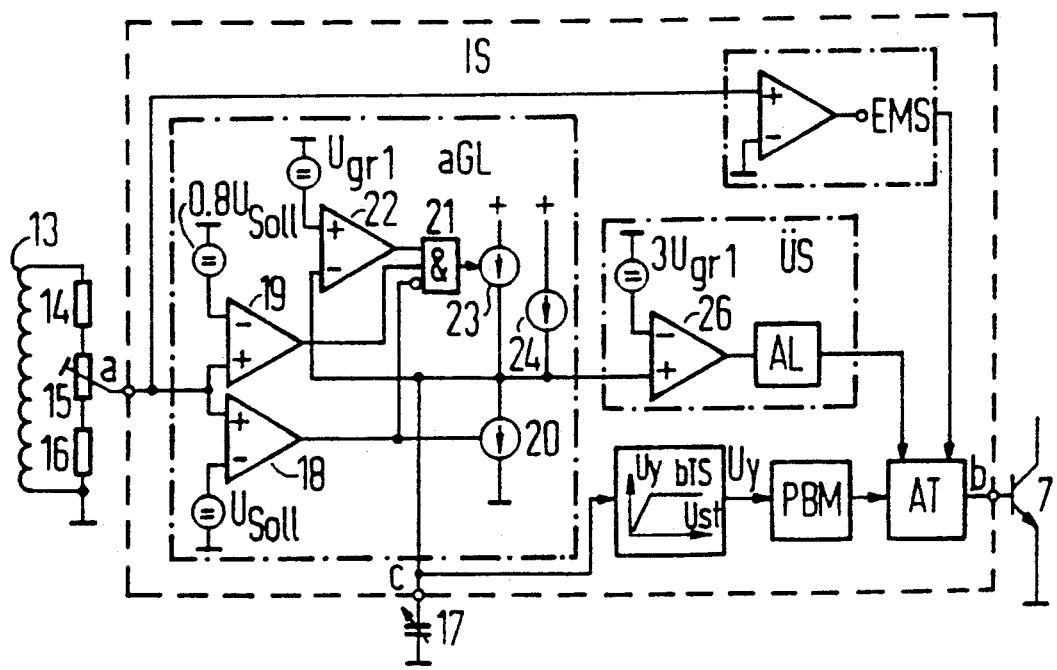
FIG. 2 is a circuit diagram showing an integratable trigger circuit of the circuit of FIG. 1 in greater detail.

The aforementioned switching blocks of the trigger component IS are shown in greater detail in FIG. 2. In the active rectifier aGL, the feedback voltage $U_{RK}$ that is applied is first carried to the positive inputs of first and second comparators 18, 19, having negative inputs which are connected to set-point voltages $U_{Soll}$ of approximately 2 V for the comparator 18 and 0.8 $U_{Soll}$ for the comparator 19. The output of the comparator 18 controls a current sink 20, while the output of the comparator 19 is carried to a first non-inverting input of an AND gate 21. An inverting input of the gate 21 is at the output voltage of the comparator 18. A second or further non-inverting gate input is supplied by the output of a third comparator 22, having a positive input which is connected to a limiter voltage $U_{gr1}$ (1.5 V) and a negative input which is connected to the variable capacitor 17. The current sink 20 and respective first and second weak current sources 23 and 24 are likewise carried to the variable capacitor 17. The first current source 23 is controlled by the output of the AND gate 21.

The variable capacitor 17 is also connected to both the limiting transfer circuit bTS and the monitoring circuit ÜS. As FIG. 2 shows, the monitoring circuit includes not only the turn-off or cutoff logic AL but also a fourth comparator 26, which activates the logic whenever the voltage at the variable capacitor 17 exceeds a further limit value $U_{gr2}$. In the present example, $U_{gr2}=4.5$ V.

When the switching power supply is in operation, the elements of the trigger component described above operate as follows:

During the blocking phase, the active rectifier compares the applied feedback voltage to the set-point value and varies the charge of the variable capacitor. During the flux phase, the rectifier is neutral in behavior. If the feedback voltage is between 80% and 100% of its set-point value, then the weak or controlled current source 23 charges the variable capacitor. If the feedback voltage is higher than the set-point value, then the variable capacitor is discharged by the controlled current sink 20. Superimposed on this charging and discharging process is a continuous slow charge from the weak current source 24, which puts out approximately 10 μA. This charging process, which is effected independently of the magnitude of the secondary winding voltage after activation of the apparatus, assures a soft start.

The set voltage corrected by the feedback voltage is linearly amplified in the block bTS, until such time as it has attained the value $U_{gr1}$. Once this value is exceeded, the output voltage ($U_y$) of bTS is kept constant. This transfer function is shown schematically in FIG. 2 inside the circuit block bTS. The limitation serves to prevent the width of the trigger pulses for the switching transistor 7, which depends on the magnitude of the set voltage, from rising beyond its maximum allowable value. If $U_{St}$ reaches its critical value $U_{gr1}$, then the current source 23 is switched off as well, as a consequence of a change in algebraic sign at the second or further non-inverting input of the AND gate 21.

Since the weak current source 24 continues to be active at $U_{St}$ values greater than $U_{gr1}$, the variable capacitor 17 continues to charge as long as the feedback voltage has not yet attained its set-point value. The cutoff logic switches off the switching transistor 7 whenever the variable capacitor voltage also exceeds the second limit value $U_{gr2}$, in order to protect the switching power supply against overloads on the output side.

If control loop components are defective, the output voltages of the switching power supply cannot run up, since the input signals have the same route for both control and demagnetization monitoring.

The accuracy of the control can be increased even further in practice if the ratio of the current intensities of the current source 23 and the current sink 20, that is $I_1$ and $I_2$, are modulated as a function of the pulse width of the feed-back signal set at a given time or in other words the magnitude of the set voltage. In the present example, at given wide widths at which the variable capacitor voltage is high, $I_1$ and $I_2$ are approximately equal. With decreasing pulse width, or in other words with decreasing $U_{St}$ values, $I_1$ decreases and $I_2$ increases, until both currents are reduced or increased by a total of approximately a factor of 5, for particularly narrow pulses. The reason that such a characteristic, which is readily achievable in terms of circuitry with a further pair of current sources and sinks and weighting of the two currents as a function of $U_{St}$, can improve the control, will be explained below. If the pulse width modulator emits brief pulses, then the pulses of the feedback voltage are likewise narrow, that is their edges are no longer negligible. In order to enable a correct detection of the amplitude in this case, a peak value rectification must be performed. Accordingly, at times in which the pulse has a level between 0.8 $U_{Soll}$ and $U_{Soll}$, the variable capacitor is accordingly relatively weakly charged, and where $U_{RK}$ is greater than $U_{Soll}$ it is quickly discharged. Wide pulses have negligible edges but in contrast, because of the high power transmitted, they are perturbed by high-frequency overshooting. In such cases, mean value rectification must be performed with charge and discharge currents of equal magnitude.

At a fixed predetermined $U_{Soll}$ value, experience has shown that it is not readily possible to always process narrow trigger pulses with a peak value rectification and to always process wide trigger pulses with a mean value rectification. In particular, the control loop can sometimes be observed to switch back and forth between the two types of rectification. In order to avoid these instabilities, it is sufficient to raise the set-point value somewhat with decreasing pulse width, for instance from 2 V to 2.1 V.

The relationships among the currents $I_1$, $I_2$ and $I_3$ and the voltages $U_{RK}$ and $U_{St}$ are shown again in graph form in FIG. 3. The current at the variable capacitor is plotted relative to the feedback voltage $U_{RK}$, at three different values of the voltage present at the variable capacitor (0.75 V, 1.3 V and 2 V). It can be seen that up to the threshold value of 0.8 $U_{Soll}$ (1.6 V) only $I_3$ flows. Above 0.8 $U_{Soll}$, at a higher $U_{St}$ value (1.3 V), a charge current at the level of approximately 1 mA first flows, and above the set-point value of the feedback voltage (2 V) it is inverted into a discharge current of approximately the same current intensity. At a low variable capacitor voltage, in other words with narrow trigger pulses or a low output power, the variable capacity is discharged above the threshold value at approximately 1/5 mA Above a slightly raised $U_{Soll}$ value (2.1 V), discharging at high current intensity then begins. If the variable capacitor voltage is above its limit value (1.5 V), then the first current source remains off even at $U_{RK}$ values<2 V. At $U_{RK}$ values>2 V, the variable capacitor is then discharged with approximately 1 mA.

In the exemplary embodiment described above, the active rectifier varies its type of rectification as a function of the trigger pulse width. It would also be possible instead to introduce a pulse-width-dependent polling delay for the rectifier, which is brief, given short pulses or in other words low output power, and lengthens with increasing pulse width or in other words higher output power. The information on the output power can be drawn from the feedback voltage. Rectifiers with this kind of variable idle time are less sensitive to the high-frequency oscillations at the onset of the blocking phase (that is, transformer ringing) and they provide better stabilization of audio loads (crosstalk) in particular.

The invention is not limited merely to the exemplary embodiment shown. Both fixed-frequency and free-oscillating blocking oscillator converters are possible. Moreover, one skilled in the art has considerable freedom in terms of the specific construction of the trigger component. For instance, it would be conceivable to make the width of the trigger pulses decrease instead of increase with increasing variable capacitor voltage. In that case, however, the soft start would have to be achieved in some other way.

We claim:

1. Circuit configuration for a controlled blocking oscillator converter switching power supply, comprising:
   (A) an electric switch having a duty cycle;
   (B) a transformer having
      (a) a primary winding connected in series with said electric switch in the loop of a direct voltage source for alternatingly turning on said switch in a first operating phase and turning off said switch in a second operating phase, and
      (b) a secondary winding outputting an alternating voltage from which a direct voltage is obtained;
   (C) a variable capacitor having a voltage;
   (D) an integratable trigger circuit connected to said switch for pulse width modulated switching of said switch, said integratable trigger circuit having
      (a) a controller for receiving an input voltage being at least approximately proportional to the alternating voltage, for comparing the input voltage with a set-point voltage, and for deriving a further voltage from the difference between the input and set-point voltages, said further voltage being the voltage of said variable capacitor, said controller including a controlling rectifier for charging said variable capacitor when the input voltage is less than the set-point voltage and discharging said variable capacitor when the input voltage is greater than the set-point voltage during the second operating phase, and
      (b) a pulse width modulator connected between said controlling rectifier and said variable capacitor for determining the duty cycle of said switch as a function of the further voltage.

2. Circuit configuration according to claim 1, wherein the first operating phase is a flux phase, the second operating phase is a blocking phase, the direct voltage is an output voltage, and said rectifier is an active rectifier.

3. Circuit configuration according to claim 2, including a current source outputting a first current intensity and being connected to said variable capacitor for charging and discharging said variable capacitor, and a switchable current sink receiving a second current intensity, being switched on only when the feedback voltage is greater than the set-point voltage, and being connected to said variable capacitor, wherein the first and the second current intensities are modulated as a function of the magnitude of the set voltage.

4. Circuit configuration according to claim 2, including a switchable current source outputting a first current intensity and being connected to said variable capacitor for charging and discharging said variable capacitor, and a switchable current sink receiving a second current intensity and being connected to said variable capacitor, said current source being switched on only if the feedback voltage is less than the set-point voltage, and said switchable current sink being switched on only when the feedback voltage is greater than the set-point voltage.

5. Circuit configuration according to claim 3, wherein said current source is switched on only whenever the feedback voltage is greater than a threshold value.

6. Circuit configuration according to claim 3, wherein said current source is switched on only whenever 0.5 the set-point voltage is less than a threshold value which is less than 0.9 the set-point voltage.

7. Circuit configuration according to claim 4, wherein said current source is switched on only whenever 0.5 the set-point voltage is less than a threshold value which is less than 0.9 the set-point voltage.

8. Circuit configuration according to claim 4, including an and gate having at least two inputs and an output with an output voltage, and first and second comparators having positive and negative inputs and outputs with output voltages, the feedback voltage being fed to the positive inputs of said comparators; the set-point voltage being fed to the negative input of the first comparator, the threshold value being fed to the negative input of the second comparator; the output voltage of the first comparator being fed to one of the inputs of the gate and to said current sink for switching said current sink; the output of said second comparator being connected to the other of the inputs of said gate, the output voltage of said gate being fed to said current source for switching said current source, and said current source being switched on when the threshold value is less than the feedback voltage which is less than the set-point voltage.

9. Circuit configuration according to claim 5, including an and gate at least two inputs and an output with an output voltage, and first and second comparators having positive and negative inputs and outputs with output voltages, the feedback voltage being fed to the positive inputs of said comparators; the set-point voltage being fed to the negative input of the first comparator, the threshold value being fed to the negative input of the second comparator; the output voltage of the first comparator being fed to one of the inputs of the gate and to said current sink for switching said current sink; the output of said second comparator being connected to the other of the inputs of said gate, the output voltage of said gate being fed to said current source for switching said current source, and said current source being switched on when the threshold value is less than the feedback voltage which is less than the set-point voltage.

10. Circuit configuration according to claim 6, including an and gate having at least two inputs and an output with an output voltage, and first and second comparators having positive and negative inputs and outputs with output voltages, the feedback voltage being fed to the positive inputs of said comparators; the set-point voltage being fed to the negative input of the first comparator, the threshold value being fed to the negative input of the second comparator; the output voltage of the first comparator being fed to one of the inputs of the gate and to said current sink for switching said current sink; the output of said second comparator being connected to the other of the inputs of said gate, the output voltage of said gate being fed to said current source for switching said current source, and said current source being switched on when the threshold value is less than the feedback voltage which is less than the set-point voltage.

11. Circuit configuration according to claim 7, including an and gate at least two inputs and an output with an output voltage, and first and second comparators having positive and negative inputs and outputs with output voltages, the feedback voltage being fed to the positive inputs of said comparators; the set-point voltage being fed to the negative input of the first comparator, the threshold value being fed to the negative input of the second comparator; the output voltage of the first comparator being fed to one of the inputs of the gate and to said current sink for switching said current sink; the output of said second comparator being connected to the other of the inputs of said gate, the output voltage of said gate being fed to said current source for switching said current source, and said current source being switched on when the threshold value is less than the feedback voltage which is less than the set-point voltage.

'12. Circuit configuration according to claim 3, including a second current source connected to said variable capacitor for continuously charging said variable capacitor with a third current intensity during operation of the switching power supply, the third current intensity being less than 1/10 the first current intensity.

13. Circuit configuration according to claim 12, wherein 1/1000 the first current intensity is less than the third current intensity which is less than 1/50 the first current intensity.

14. Circuit configuration according to claim 2, including a voltage-limiting transfer circuit connected between said variable capacitor and said pulse width modulator, said transfer circuit having an output voltage being proportional up to a first set voltage limit value and remaining constant beyond the first set voltage limit value as the set voltage increases.

15. Circuit configuration according to claim 14, wherein when the feedback voltage is less than the set-point voltage, said variable capacitor is charged only whenever the set voltage also remains below the first set voltage limit value.

16. Circuit configuration according to claim 15, including a switchable current source outputting a first current intensity and being connected to said variable capacitor for charging and discharging said variable capacitor, a switchable current sink receiving a second current intensity and being connected to said variable capacitor, said current source being switched on only if the feedback voltage is less than the set-point voltage, and said switchable current sink being switched on only when the feedback voltage is greater than the set-point voltage, and And gate having three inputs and an output with an output voltage, first and second comparators having positive and negative inputs and outputs with output voltages, the feedback voltage being fed to the positive inputs of said comparators; the set-point voltage being fed to the negative input of the first comparator, the threshold value being fed to the negative input of the second comparator; the output voltage of the first comparator being fed to one of the inputs of the gate and to said current sink for switching said current sink; the output of said second comparator being connected to another of the inputs of said gate, the output voltage of said gate being fed to said current source for switching said current source, said current source being switched on when the threshold value is less than the feedback voltage which is less than the set-point voltage, and a third comparator having a positive input at the first set voltage limit value, a negative input receiving the set voltage and an output connected to a further one of the inputs of the gate, said gate switching on said current source only whenever the threshold value is less than the feedback voltage which is less than the set-point voltage and the set voltage is less than the first set voltage limit value.

17. Circuit configuration according to claim 14, including a monitoring circuit connected to said switch for switching off said switch whenever the set voltage exceeds a second set voltage limit value.

18. Circuit configuration according to claim 17, wherein 2 times the first set voltage limit value is less than the second set voltage limit value which is less than 5 times the first set voltage limit value.

19. Circuit configuration according to claim 16, including a fourth comparator having a positive input connected to said variable capacitor, a negative input receiving a second set voltage limit value and an output, and a cutoff logic connected between the output of said fourth comparator and said switch for preventing said switch from being switched on when the set voltage is greater than the second set voltage limit value.

20. Circuit configuration according to claim 17, including a comparator having a positive input connected to said variable capacitor, a negative input receiving the second set voltage limit value and an output, and a cutoff logic connected between the output of said comparator and said switch for preventing said switch from being switched on when the set voltage is greater than the second set voltage limit value.

21. Circuit configuration according to claim 3, wherein the first current intensity decreases and the second current intensity increases with decreasing pulse width of the feedback voltage.

22. Circuit configuration according to claim 21, wherein the first current intensity has approximately the same magnitude as the second current intensity when the feedback voltage has wide pulses.

23. Circuit configuration according to claim 22, wherein the first current intensity decreases by a total of a factor between 2 and 10 and the second current intensity increases by a total of a factor of more than 2, with decreasing pulse width of the feedback voltage.

24. Circuit configuration according to claim 22, wherein the first current intensity decreases by a total of a given factor of approximately 5 and the second current intensity increases by a total of said given factor of approximately 5, with decreasing pulse width of the feedback voltage.

25. Circuit configuration according to claim 2, wherein during the blocking phase said active rectifier does not react to the feedback voltage until a predetermined time has elapsed since the beginning of the blocking phase, upon the charging or discharging of said variable capacitor.

26. Circuit configuration according to claim 25, wherein the predetermined time is an idle time which depends on the pulse width of the feedback voltage and increases with increasing pulse width.

27. Circuit configuration according to claim 26, wherein the idle time begins at a value of about 1 microsecond.

28. Circuit configuration according to claim 2, wherein the set-point voltage is raised with decreasing pulse width of the feedback voltage.

29. Circuit configuration according to claim 2, including means for tapping a measurement voltage from the feedback voltage being at least approximately proportional to the secondary winding voltage, and a demagnetization monitor connected to said switch for receiving the measurement voltage and enabling said switch to be switched on only whenever the measurement voltage in the blocking phase has crossed a predetermined threshold value.

30. Circuit configuration according to claim 2, including another secondary transformer winding in the form of a control winding having a loop, and a voltage divider being connected in said loop of said control winding and having a pickup from which the feedback voltage is obtained.

31. Circuit configuration according to claim 29, including another secondary transformer winding in the form of a control winding having a loop, and a calibratable voltage divider being connected in said loop of said control winding and having a pickup from which the feedback voltage and the measurement voltage are obtained.

* * * * *